United States Patent [19]

Balaz

[11] 4,044,661
[45] Aug. 30, 1977

[54] APPARATUS FOR MAKING A MARBLED MEAT FOOD PRODUCT

[75] Inventor: Alexander Balaz, Elkhart, Ind.

[73] Assignee: The Quaker Oats Company, Chicago, Ill.

[21] Appl. No.: 598,583

[22] Filed: July 24, 1975

Related U.S. Application Data

[62] Division of Ser. No. 521,241, Nov. 6, 1974, abandoned.

[51] Int. Cl.² .............................................. A47J 43/00
[52] U.S. Cl. ...................................................... 99/355
[58] Field of Search ................................... 99/355, 353

[56] References Cited

U.S. PATENT DOCUMENTS

| 3,167,000 | 1/1965 | Sassen et al. | 99/355 |
| 3,238,046 | 3/1966 | Komarik | 99/355 |
| 3,374,728 | 3/1968 | Owens | 99/441 |

Primary Examiner—Robert I. Smith
Attorney, Agent, or Firm—Charles J. Hunter

[57] ABSTRACT

A process for the production of a semi-moist food product having an appearance of meat being marbled throughout with fat and a system capable of performing such a process is disclosed. The process comprises mixing separate and distinct batches of dough and cooking the dough in separate swept surface heat exchangers before combining the doughs to form a food product having a meat-like appearance.

5 Claims, 3 Drawing Figures

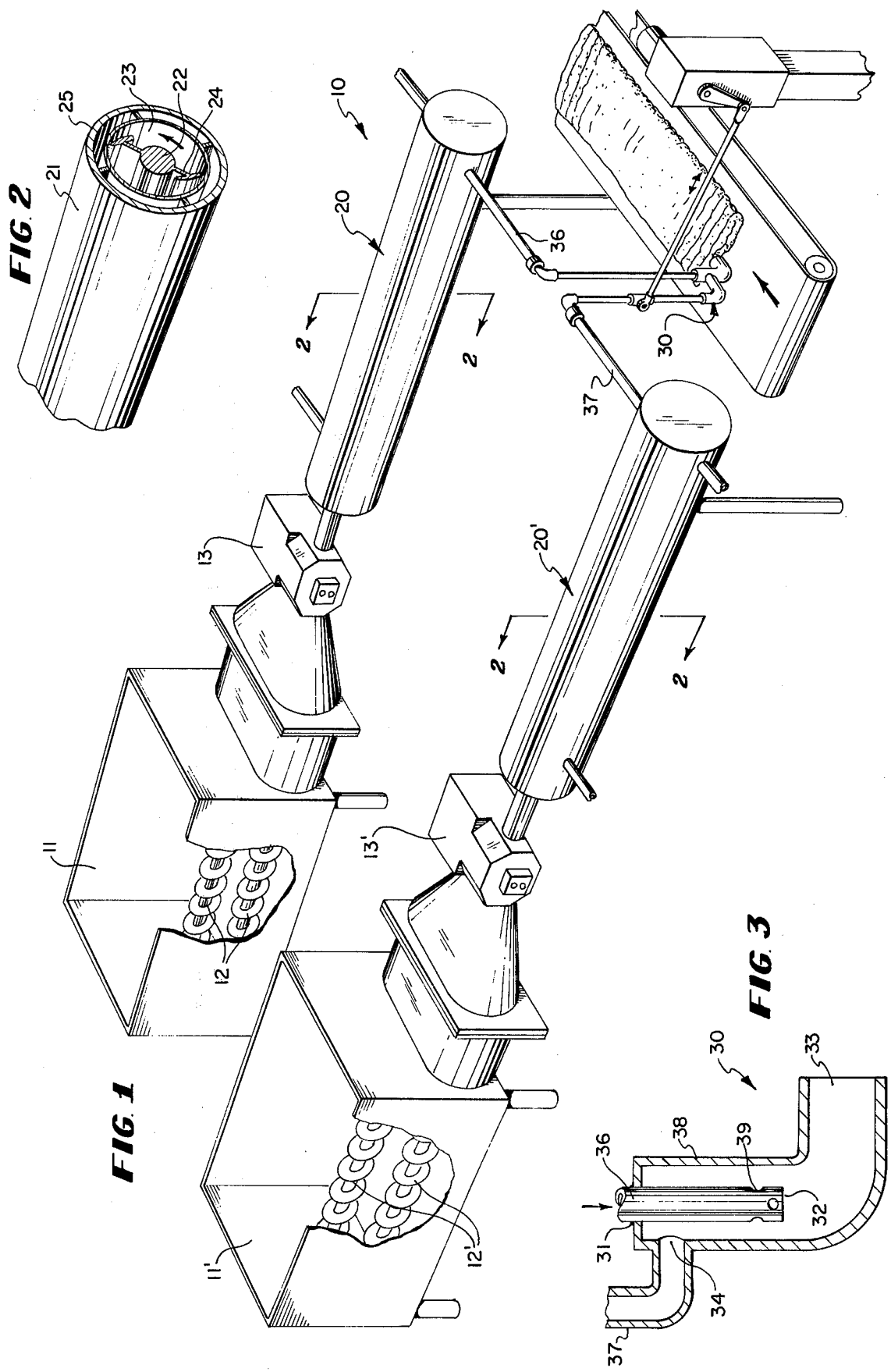

APPARATUS FOR MAKING A MARBLED MEAT FOOD PRODUCT

This is a division of application Ser. No. 521,241, filed Nov. 6, 1974 and now abandoned

BACKGROUND OF THE INVENTION

1. Field of the Invention

The invention relates to the production of a semi-moist food product having a meaty appearance. The food product is produced in a manner such that it resembles meat marbled throughout with fat.

2. Description of the Prior Art

Presently only two methods for the production of semi-moist marbled meat food products are known. These methods of thoroughly described in U.S. Pat. No. 3,380,832 issued to David P. Bone and U.S. Pat. No. 3,765,902 issued to Wayne M. Charter. As discussed in the Charter patent, the process described by Bone suffers from the disadvantage of requiring excessive personal attention. Although the apparatus and process described by Charter appears to alleviate the problems of excessive personnel, the Charter process requires the use of extruders to cook the dough-like material forming the food product. Such extruder-cookers, however, are capable of handling only viscous doughs. Should the product desired require the use of a dough having a low viscosity, extruders of the type used by the prior art would not be capable of cooking such a dough. This becomes apparent when the product desired is to have a final moisture content above 35 percent. To produce a product having a high moisture content requires the use of doughs having extremely low viscosity. Without the use of viscosity builders within the dough, extruders are not capable of working the dough to produce a substantially solid type of food product. Further, these extruder-cookers are complex pieces of equipment which require the use of a plurality of barrel sections, each section being maintained at different temperature levels. Such cookers must be inspected and cleaned at frequent intervals requiring a great deal of effort. Consequently much effort has been undertaken to find systems for the production of semi-moist foods which do not require the use of complex, expensive extruder-cookers, yet yield a product of the same quality as that obtained when using such extruder-cookers.

SUMMARY OF THE INVENTION

It is, therefore, an object of the present invention to provide a process for the production of a food product having the appearance of raw meat being marbled throughout with fat; said food product being of the semi-moist type containing between 25–50 percent moisture.

It is another object of the present invention to provide a novel system for the production of a semi-moist pet food, especially those semi-moist pet foods having a moisture content above 35 percent.

Still another object of the present invention is to provide a system that eliminates the necessity of complex, expensive extruder-cookers which have previously been required to produce marbled, semi-moist food products.

These and other objects of the invention are accomplished by utilizing a specific type of heat exchanger to cook the masses of dough forming the food product. The system utilizing the heat exchangers is capable of forming a semi-moist food product from low as well as high viscous doughs. Other objects, advantages and novel features of this invention will become apparent to the following detailed description of the invention when considered in conjunction with the accompanying drawings wherein:

FIG. 1 illustrates a perspective view of the system utilized to produce a semi-moist food product;

FIG. 2 illustrates a cross-section of the swept surface heat exchanger utilized in the system of FIG. 1, said cross-section being taken along line 2—2 of FIG. 1; and FIG. 3 is an illustration of the means utilized within the system to combine the two dough-like masses of material, said means comprising the interior of two pipes through which the two doughs forming the marbled food product are mixed and extruded.

DETAILED DESCRIPTION

A marbled food product may be obtained utilizing the novel system of the invention by combining a first dough-like mass of material having the appearance of lean red meat, and a second dough-like material having the appearance of fat. These separate and distinct masses of dough-like material are combined in such a manner and at such a rate to produce a product having the appearance of meat being marbled throughout with fat. The dough-like masses are produced by combining the following ingredients:

| Ingredient | Percent |
| --- | --- |
| Meat | 30–70 |
| Sugar | 15–30 |
| Caseinate salt | 4–25 |
| Polyhydric alcohol | 0–10 |
| Sorbic acid or its salts | 0.06–0.3 |
| Starch | 0.5–10 |
| Vitamins, minerals, and other supplements | as desired |

To the above ingredients there is added sufficient water to bring the total moisture content within the dough to a range between 25–50 percent. Although it is within the scope of the invention to use this system for production of low moisture food products, the system is especially useful for the production of substantially solid, high moisture, semi-moist food products, e.g., above 35 percent moisture, which cannot be formed by extrusion-cooking techniques.

In order to produce a dough-like material having the appearance of lean, red meat, a coloring agent must be added to the dough, typically a combination of FD&C Red No. 2 and FD&C Yellow No. 6. To provide the appearance of fat, the second dough must be mixed with a small amount of coloring agent as well. This may be accomplished by adding a small amount of a coloring agent such as titanium dioxide to the second dough. An addition of less than 1 percent of the coloring agent to the dough will provide the requisite color.

As used herein, all percentages are understood to be by weight and based upon the total weight of the dough unless specified otherwise. The term "meat" is understood to include the flesh of cattle, swine, sheep, goats, horses, whale and other mammals, poultry and fish. The food product may contain meat by-products in lieu of meat. Meat by-products are understood to be those accepted by Title 9, Chapter 1, Subchapter H of the Code of Federal Regulation, 1971 Edition, and also to include meat and bone meal, fish meal, fish product concentrate, poultry by-products and blood meal. It is customary to grind the meat before mixing it with the remaining ingredients.

Since the food produced in one which requires neither hermetic sealing nor refrigeration, it must be protected from microbiological decomposition. Such decomposition is prevented by the use of water-soluble solids such as sugar and the polyhydric alcohols. As used herein the term "sugar" includes those sugars that are normally accepted within the food art, and typically include sucrose, glucose, corn syrup sugars and the like. Polyhydric alcohols useful are those having the general formula $HOCH_2(CHOH)_mCH_2OH$ where $m$ is a number from 0-5 but also expressly including propylene glycol, sorbitol, mannitol, and 1,3-butanediol.

In the practice of the invention water-soluble solids are added in an amount sufficient to produce a product having a water activity of less than 0.90 as defined in U.S. Pat. No. 3,756,902. By restricting the water activity and also adding a mold inhibitor such as sorbic acid or its salts, especially potassium sorbate, microbiological decomposition is prevented without the use of hermetically sealed containers or refrigeration.

As discussed in U.S. Pat. No. 3,380,832, the caseinate salt adhesive is used in an amount sufficient to provide stickiness at temperatures above 120° F. The preferred adhesive is sodium caseinate, however, other caseinate salts, such as calcium, potassium, magnesium, and ammonium caseinate may be used as well. Additional protein, such as that derived from soybeans may be used to provide additional nutrition as well as a replacement for the caseinate salt.

The process of the invention contemplates the blending and cooking of two separate and distinct dough-like masses of material. As noted above, each dough contains a different coloring agent so as to cause one dough to have the appearance of lean, red meat while the second dough as the appearance of fat. After each dough-like mass of material is cooked, they are combined at such a rate to form a marbled, meat-like appearing food product. The invention further contemplates the use of a novel system as illustrated by FIG. 1 to produce the food product. The system of FIG. 1 comprises two separate but similar lines of equipment. One line is utilized to form a dough-like mass of material having the appearance of fat, while the other line is utilized to produce a dough-like material having the appearance of lean, red meat. The system utilizes two separate continuous feeding means 11 and 11', comprising a hopper and a plurality of screw conveyors 12 and 12'. The doughs are blended in a batch-type mixer before they are introduced into continuous feeding means 11 and 11'. After being thoroughly blended, each dough-like mass of material is pumped from the feeding means to a swept surface heat exchanger 20 and 20' by the use of a rotary positive displacement pump 13 and 13'. The dough-like mass of material is cooked within the swept surface heat exchanger before it is combined with the other dough-like mass of material. As illustrated in FIG. 1, the dough-like mass of material having the appearance of lean, red meat is cooked in the heat exchanger 20' and then red into the entrance end of pipe 37 while the dough-like mass of material having the appearance of fat is cooked in heat exchanger 20 and then fed into the entrance end of pipe 36.

The separately cooked doughs are then mixed utilizing the apparatus illustrated by FIG. 3. The first pipe 36 may be totally closed except at end 32 or if a finer marbling is desired, it may be closed at end 32 as illustrated in FIG. 3, and contain a plurality of holes 39 through which the cooked fat-like dough may be extruded. This first pipe 36 is totally enclosed by the second pipe 38 having a discharge port 33 and an entrance 34 to which pipe 37 is connected. The second pipe is sealed about the first pipe at contact point 31 to prevent any leakage of material. The mixing means illustrated by FIG. 3 is utilized to distribute the fat-like mass of material cooked in the heat exchanger 20 with the mass of material having the appearance of lean, red meat which was cooked in heat exchanger 20'. The dough-like masses of material are combined in such a manner that from 70-90 percent of the final product comprises that dough-like mass of material having the appearance of lean, red meat. Although the use of from 70-90 percent of the red meat-like dough is preferred for reasons of appearance, any combination of one dough with the other is within the scope of the invention. The combined cooked dough may then be extruded either through the discharge port 33 onto an air or water cooled conveyor or merely deposited in pans and cooled ambiently.

FIG. 2 is illustrative of a cross-sectional view of the swept surface heat exchanger utilized in the system of the invention. Such heat exchangers comprise an annular housing 21 surrounded by an outer jacket 25 through which steam may be injected to provide the requisite heat. It has been found that a steam pressure of about 50-100 psig and a temperature of 210°-300° F., preferably 220°-260° F., will provide the requisite heat required to cook the dough-like masses of material. The heat exchanger further utilizes a plurality of scraper blades 24 which are connected to the inner wall 22 of said annular housing and extend radially within said annular housing so that they touch the outer surface 23 of said annular housing. These scraper blades are power driven by motors (not shown) so that the dough-like mass of material being fed through the heat exchangers are constantly being scraped and swept by the blades 24 as it passes through the heat exchanger.

By utilizing the system of the invention, a food product having the appearance of meat being marbled throughout with fat can be produced without utilizing complex equipment. The food product produced is very palatable and shelf stable. The system is capable of cooking semi-moist doughs of either low viscosity or high viscosity while utilizing less space than conventional cooking systems.

Obviously modifications of this invention are possible. It is understood, therefore, that this application is intended to cover any variations, uses, or adaptations of the invention as may be considered to be known or customary practice in the art to which the invention pertains.

Having fully described and disclosed the invention, it is claimed:

1. A food processing system comprising: first pumping means for pumping a first dough containing a first coloring agent through a first swept surface heat exchanger into the entrance of a first conduit, said first conduit having an entrance and an outlet end, said first conduit being substantially closed at its outlet end and having a plurality of openings adjacent to the substantially closed outlet end; second pumping means for pumping a second dough containing a second coloring agent through a swept surface heat exchanger into the entrance of a second conduit, said second conduit having a discharge port and an inner cavity, said inner cavity of said second conduit completely enclosing said outlet end of said first conduit whereby said second dough containing a second coloring agent may be admixed with said first dough.

2. A system according to claim 1 wherein each of said first and second pumping means comprises a pump and a plurality of screw conveyors within a hopper.

3. A system according to claim 1 wherein said swept surface heat exchanger comprises an annular housing, an outer jacket containing an inlet and an outlet, said jacket sealingly engaged about said annular housing, and a plurality of power driven scraper blades connected to the inner wall of said annular housing and extending radially within the cavity of said annular housing, said scraper blades being of sufficient length to scrape the outer wall of said annular housing.

4. A food processing system comprising:
 a. a first swept surface heat exchanger;
 b. a second swept surface heat exchanger;
 c. a first conduit having an outlet end;
 d. a second conduit having an entrance, an inner cavity, and a discharge port, said inner cavity of said second conduit completely enclosing said outlet end of said first conduit;
 e. first pumping means for pumping a first dough containing a first coloring agent through said first swept surface heat exchanger and through said first conduit, said first dough exiting from the outlet end of said first conduit;
 f. second pumping means for pumping a second dough containing a second coloring agent through said second swept surface heat exchanger into the entrance of said second conduit and out of the discharge port of said second conduit, whereby said second dough is admixed with said first dough;
 g. first supply means for continuously supplying said first dough to said first pumping means; and
 h. a second supply means for continuously supplying said second dough to said second pumping means.

5. A system according to claim 4 wherein each of said first and second supply means comprises a plurality of screw conveyors within a hopper.

* * * * *